United States Patent
Gupta et al.

(10) Patent No.: US 12,455,765 B2
(45) Date of Patent: Oct. 28, 2025

(54) AUTOMATIC SELECTION OF COMPUTER HARDWARE CONFIGURATION FOR DATA PROCESSING PIPELINES

(71) Applicant: Microsoft Technology Licensing, LLC, Redmond, WA (US)

(72) Inventors: Vivek Gupta, Groton, MA (US); Andrea Treviño Gavito, Boston, MA (US); Mawulolo Koku Ameko, Charlottesville, VA (US); Wee Hyong Tok, Redmond, WA (US); Sean Gormley T. Kelley, Boston, MA (US); Yanjie He, Rockville, MD (US); Mark Kromer, Snohomish, WA (US); Abhishek Uday Kumar Shah, Seattle, WA (US); Ehimwenma Nosakhare, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 572 days.

(21) Appl. No.: 17/845,634

(22) Filed: Jun. 21, 2022

(65) Prior Publication Data
US 2023/0409387 A1 Dec. 21, 2023

(51) Int. Cl.
*G06F 9/46* (2006.01)
*G06F 9/445* (2018.01)
*G06F 9/48* (2006.01)
*G06F 9/50* (2006.01)

(52) U.S. Cl.
CPC ........ *G06F 9/4881* (2013.01); *G06F 9/44505* (2013.01); *G06F 9/5027* (2013.01)

(58) Field of Classification Search
CPC ...................................................... G06F 9/4881
USPC .......................................................... 718/102
See application file for complete search history.

(56) References Cited

U.S. PATENT DOCUMENTS

| | | | |
|---|---|---|---|
| 10,176,067 B1* | 1/2019 | Bramhill | G06F 11/2294 |
| 11,513,866 B1* | 11/2022 | Cnudde | G06F 9/5083 |
| 2014/0047228 A1* | 2/2014 | Attar | G06F 9/44505 713/2 |
| 2018/0113742 A1* | 4/2018 | Chung | G06F 9/4881 |
| 2019/0129615 A1* | 5/2019 | Sundar | G06F 9/451 |
| 2019/0265996 A1* | 8/2019 | Shevade | G06F 9/45558 |
| 2019/0317805 A1* | 10/2019 | Metsch | G06N 20/00 |
| 2019/0391742 A1* | 12/2019 | Bhagi | H04L 67/1095 |
| 2020/0065712 A1* | 2/2020 | Wang | G06N 20/20 |
| 2021/0089961 A1* | 3/2021 | Zeise | G06N 20/00 |
| 2021/0132947 A1* | 5/2021 | John | G06F 18/24137 |
| 2021/0357259 A1* | 11/2021 | Gan | G06F 9/5094 |
| 2021/0397225 A1* | 12/2021 | Sharma | G06N 20/00 |
| 2022/0159315 A1* | 5/2022 | Liang | G06Q 30/0208 |
| 2023/0259385 A1* | 8/2023 | Rosenberg | G06F 11/34 718/1 |
| 2023/0409386 A1* | 12/2023 | Zorin | G06F 9/4856 |

(Continued)

*Primary Examiner* — Mehran Kamran

(57) ABSTRACT

A method for recommending a computer hardware configuration, including: receiving, by a processor, a machine-readable specification of a computing task; extracting, by the processor, a plurality of features from the machine-readable specification of the computing task; supplying, by the processor, the plurality of features to a reinforcement learning model to generate a proposed computer hardware configuration to execute the computing task; and providing, by the processor, the proposed computer hardware configuration to a user.

20 Claims, 10 Drawing Sheets

(56) References Cited

U.S. PATENT DOCUMENTS

2023/0409387 A1\* 12/2023 Gupta ................. G06F 9/44505
2024/0276399 A1\* 8/2024 Vasudevan ............ H04W 24/02

\* cited by examiner

AUTOMATIC SELECTION OF COMPUTER HARDWARE CONFIGURATION FOR DATA PROCESSING PIPELINES

BACKGROUND

Cloud computing services provide on-demand access to computing resources based on the needs of their users, without requiring active management of the computing resources by those users. In the past, users who needed access to computing resources typically purchased computer hardware and installed that computer hardware in offices or server rooms (e.g., onsite or in offsite data centers) managed by the users themselves or their organizations. However, maintenance and management of computer hardware, such as performing software updates, replacing failed hardware, upgrading to new hardware, and the physical storage requirements impose significant overhead. In addition, many users may have uneven demand for computing, such that the hardware may sometimes remain unused for significant periods of time while still incurring the underlying maintenance costs. Furthermore, relying on older, lower performance hardware may result in longer compute times, thereby potentially hampering productivity.

Cloud computing services typically rent computing resources to users based on time (e.g., on an hourly basis), where the pricing rate depends on the computational resources rented (e.g., clock speeds of the processors, numbers of processor cores, amount of memory, and the like). As such, users pay for only the time and computing resources that they need to complete their computing tasks. Users deploy their application software onto the cloud computing resources, which execute the application software accordingly. One approach to cloud computing is "serverless" computing, which further abstracts the underlying computing resources by allowing the user to deploy code to computing hardware, without requiring the users to also configure and maintain underlying software (e.g., operating systems, device drivers, and the like) and hardware (e.g., local storage, specialized accelerator co-processors, and the like).

Many cloud computing providers require users to specify or select a computer hardware configuration for the particular computing resources (the computer system or computer systems) that will execute the computing tasks. These types of computer systems generally include number of processing cores (e.g., central processing unit or CPU cores), attached memory capacity (e.g., gigabytes of dynamic random access memory or DRAM), the number of attached hardware accelerators (if any) such as graphics processing units (GPUs), specialized artificial intelligence (AI) accelerators, field programmable gate arrays (FPGAs), and the like.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology relates to systems and methods for automatically determining a proposed computer hardware configuration for a computer system to execute a particular computing task with expected good performance, such as by determining a computer hardware configuration that implements an efficient trade-off between cost to the user and execution runtime of the computing task. This allows a user to design their computing task and then execute the task without having to determine a particular hardware configuration that would be best suited to running that computing task. The system according to examples of the present technology observes the performance of various computing tasks on different computer hardware configurations and automatically learns to generate better-suited computer hardware configurations for given input computing tasks. This automatic learning process also causes a self-tuning computer hardware configuration system to automatically and continuously (or periodically) adapt to changes in the data (e.g., data distribution, skewness of the data, and the like), changes in the computer hardware (e.g., different computer processors with different performance characteristics on different types of data, different computer memory configurations with different bandwidth and/or latency characteristics, and different input/output connection properties), and changes in software environments supporting the computing tasks (e.g., where changes in operating system kernel code, software libraries, and/or software platforms result in changes in the performance characteristics of particular tasks).

In some examples, a computing task includes a sequence of transformations applied to input data, where the computing task is specified in a computer-readable format, such as program instructions or a specification of a data processing pipeline, where the data processing pipeline converts raw input data into a form that is cleaned and simplified for performing further data science or machine learning analysis. Based on the instructions of the computing task (e.g., the particular transformations applied to the data) and the size of the input data (e.g., number of data samples and the number of fields associated with each data sample), the method automatically determines a computer hardware configuration (e.g., number of processor cores, an amount of installed memory, and the like) that is expected to execute the computing task in a time-efficient and cost-efficient manner.

In some examples of the present technology, a plurality of features representing the computing task are extracted from user input, and the features are provided to a statistical model that is trained to predict a hardware configuration of a computer system that will execute the computing task with good performance, without requiring the user to specify aspects of the computer hardware configuration. In some examples, performance is measured by total execution runtime, but is not limited thereto and a performance score may be computed for a particular execution based on total execution time and/or other factors such as power consumption.

In some examples, the statistical model is a reinforcement learning model that is trained based on training data collected from previous executions of other computing tasks, where a sample of the training data associated with a previous execution includes the features extracted from the associated computing task, the hardware configuration of the computer system that executed the computing task, and an evaluation of the performance of the execution (e.g., a total execution runtime).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
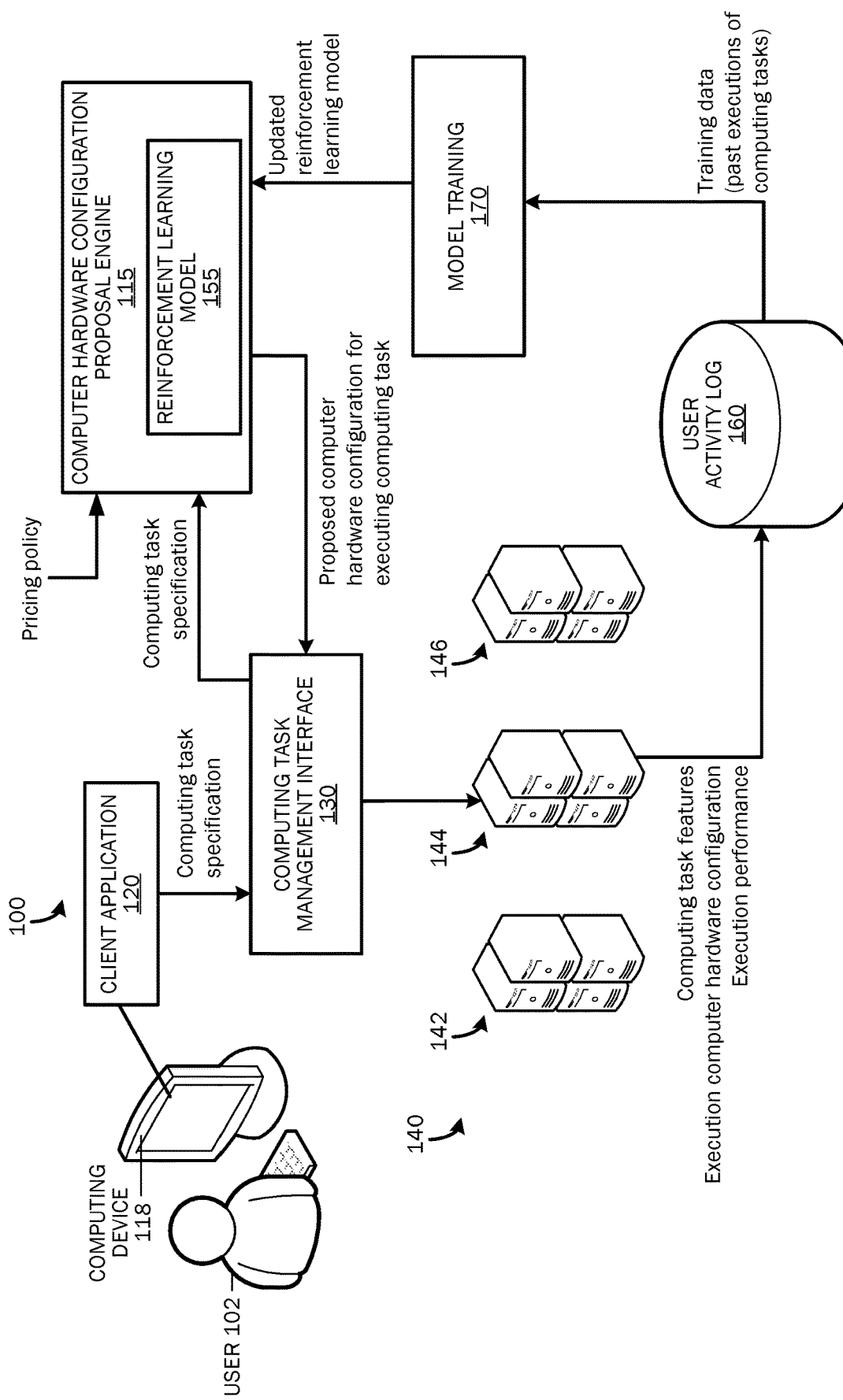
FIG. 1 is a block diagram illustrating a computing task execution system including a self-tuning computer hardware configuration proposal system according to one example of the present technology.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

Cloud computing services frequently offer a variety of different computing configurations tailored for different workloads. For example, some computing tasks may be referred to as being compute-bound, in which the time needed to complete the computing task is determined mainly by the speed of the processor (or multiple processing cores in the case of a computing task that can be divided into smaller tasks that are distributed so that different parts of the computing task are performed by different systems), such as where many complex computations are performed on a relatively small amount of data. Other computing tasks may be referred to as being memory-bound, in which the time needed to complete the computing task is determined mainly by the amount of memory required to hold the working data, such as where many simple operations are performed across a large amount of data, where interrelations between the data mean that it is beneficial to have more of the data loaded into memory at a time (e.g., analyzing relationships in a social network graph). Still other computing tasks may be referred to as being input/output (I/O) bound in that the time needed to complete the computing task depends primarily on how quickly data can be read into the system and written out of the system, such as where there is much more data than can fit into memory and where the computing operations can be performed on each piece of data more quickly than the input/output system can deliver the data to the processors.

A cloud computing service typically provides access to a variety of different types of computer system configurations that are configured to be better suited to handling tasks that are compute-bound versus memory-bound versus I/O bound, or the like. For example, some computer systems may be compute-optimized in that they have faster or more processor cores, but perhaps a smaller amount of memory, other computer systems may be memory-optimized in that they have large amounts of memory installed and/or connected over a faster memory bus and, relatively speaking, fewer processor cores and/or slower processor cores, while still other computer systems may be input-output-optimized in that they are connected to storage devices using faster and higher bandwidth connections (communications busses) and/or may have higher performance storage devices attached to them. Some computer systems may include large amounts of memory in addition to many processors. Some computer systems may include graphics processing units (GPUs) or artificial intelligence (AI) accelerator hardware which are particularly useful for accelerating computing tasks related to artificial intelligence, such as training deep neural networks. The various types of computer hardware are typically offered to users at different prices (e.g., different hourly price rates), where more powerful computer systems are typically more expensive than less powerful computer systems, and where the end cost to the user is calculated based on the amount of time the computing resource is used (e.g., in hours) multiplied by the rate (e.g., price per hour).

Furthermore, the various computer systems provided by the cloud computing service need not be separate physical computers but may be, for example, virtual machines (e.g., virtualized systems) running on a host machine under a hypervisor. For example, a single physical server may run multiple virtual machines, where different virtual machines running on the same server may be rented to different customers. Furthermore, the different virtual machines may be dynamically configured upon request to implement the different types of computer system configurations. For example, a physical server may have 256 processor cores and 2048 GB of installed memory, and these computing resources may be allocated and dedicated to particular virtual machines in accordance with their configuration types. For example, a virtual machine providing a low performance computer system configuration may be allocated one processor core and 4 GB of memory, while a compute-optimized computer system may be implemented by allocated 144 CPU cores to the virtual machine. Virtualization allows subdividing the computing resources in a single physical server in accordance with the computing needs of the particular users of the cloud computing environment.

Users seeking to run computing tasks on cloud computing systems typically specify their computing tasks as data pipelines or data flows that describe how to ingest some input data and transformations performed on that data (e.g., performing join operations on the data, removing columns of data such as personally identifiable information, computing new columns of data based on existing columns of data, computing statistics on the data, removing outliers, removing inconsistent data, removing duplicates, and the like), and the users are also asked to specify a hardware configuration for executing their computing tasks. However, it may be difficult for a user to know which of the many configurations to select, especially if it may be unclear to the user whether the computing task that they want to run is compute-bound, memory-bound, I/O bound, or otherwise runtime constrained by some other factor. Users typically rely on trial-and-error and intuition based on experiments with previous runs when choosing a hardware configuration for their computing tasks. This can lead to user frustration, especially for new users who may not have developed an intuition for what hardware configuration would be suitable, and where executing computing tasks with incorrect choices (e.g., insufficiently powerful computer hardware configurations) may result in wasted time and effort.

One frequent choice is for the user to choose the highest performance configuration that they can afford. However, this may result in wasted resources and wasted money. For example, a user may select to run their task on a computer system with a hardware configuration of 64 gigabytes (GB) of memory, but it may turn out that their computing task had a peak memory usage of 4 GB, in which case the user might have saved money by specifying that they wanted to run their computing task on a system with 8 gigabytes of memory, with no observable difference in performance (e.g., the time taken to complete the task). Using a less powerful computer system would also allow another user to make use of the computer having 64 GB of memory, assuming the other user had a computing task that would take advantage of those resources.

Users sometimes also select computer hardware configurations that are less powerful than optimal for their computing tasks or that are optimized for the wrong problem (e.g., choosing a compute-optimized hardware configuration to run a computing task that is memory-bound). This increases the runtime of their computing tasks, which may be a lost business opportunity if the user was willing to pay more in exchange for receiving the results more quickly. In some cases, depending on the pricing arrangement for different hardware configurations, this sub-optimal choice may also increase the user's overall costs when the longer runtime outweighs the cost difference between the selected hardware configuration and the optimal hardware configuration.

Therefore, the present technology relates to systems and methods for automatically generating a proposed computer hardware configuration for a computer system (e.g., a virtual machine) to execute a particular computing task specified by a user. This allows a user to focus on designing their computing task, such as a data processing pipeline or a data flow, and proceed with running that computing task without having to determine a computer hardware configuration for running the task. For example, a user may specify their computing task as a sequence of transformations to be applied to their input data (along with some information about the characteristics of their data, such as the number of data samples and the number and size of the fields associated with each data sample). A self-tuning computer hardware configuration proposal system then provides the user with a proposed computer hardware configuration for running their computing task. The proposed computer hardware configuration may then be used to launch an instance of a computer system (e.g., a virtual machine) having that hardware configuration, which then runs the computing task.

By observing the execution performance of various computing tasks on various computer hardware configurations, the self-tuning computer hardware configuration system continually (e.g., continuously or periodically) learns and adapts to changes in the ingested data, changes and improvements in the performance of computer hardware, changes in the runtime performance of software libraries and software platforms supporting the computing tasks, and the like. In some examples of the present technology, the self-tuning computer hardware configuration proposal system includes a statistical model that is trained and/or updated based on observing the runtime behavior or runtime performance of various configurations of computer systems when executing various types of computing tasks. The system uses the observations of the runtime behavior and/or runtime performance to compute a performance score or performance metric (e.g., based on one or more of: rows of data processed per second; power consumed; total execution runtime; and the like), and rewards the statistical model or to penalize the statistical model based on whether or not the metric indicates that the runtime performance was good. The statistical model is then updated based on the rewards or penalties, such as by modifying the likelihood that the statistical model will output the proposed computer hardware configuration for similar input data sets and computing tasks (increasing the likelihood in the case of a reward and decreasing the likelihood in the case of a penalty).

The training or updating of the model may occur automatically (e.g., without human intervention) and may be performed continually as more information is received. The term continually is used herein to include continuous updates to the model (e.g., online training where updates are performed on a per-observation basis) and to also include periodic updates to the model (e.g., offline training where multiple observations are grouped into a batch that includes multiple training samples corresponding to the multiple observations and the update to the model is performed on a per-batch basis). Online or continuous updates and batch training will be described in more detail below. As such, some examples of the present technology continuously learn from a combination of past executions of computing tasks and new explorations of computer hardware configurations to continuously tune its proposals over time.

From a user perspective, a user can design a computing task once (e.g., a sequence of data transformations of a data pipeline) without needing to manually tune or select the particular computing system used to execute the computing task as the size or nature of the input data changes. Instead, the performance of the executions may simply appear to keep improving over time, e.g., as the self-tuning computer hardware configuration proposal system learns to generate better, or higher-quality, computer hardware configuration proposals, even as the size of the input data supplied to the computing task changes (e.g., grows or shrinks) as the self-tuning hardware configuration proposal system automatically reevaluates the proposals based on the parameters of the data and based on observations of previous executions. In addition to automatically adapting to changes in the data, the self-tuning computer hardware configuration proposal system according to the present technology also adapts to changes in the performance characteristics of computing environments that execute the computing tasks, such as changes in available forms of computer hardware configurations, changes in the performance characteristics of software libraries and software platforms that execution of computing tasks, and the like.

In more detail, some examples of the present technology make use of reinforcement learning (RL) techniques for training the statistical model. In some examples of the present technology, offline reinforcement learning is applied where the statistical model learns from logged feedback data (e.g., reinforcement learning feedback data) of past user interactions with the cloud computing system. This may be contrasted with designing or learning a compute configuration selection policy by an active exploration of the performance characteristics of possible configurations (e.g., generating labeled training data by manually running various computer hardware configurations on various designed data pipelines and input data).

FIG. 1 is a block diagram illustrating a computing task execution system 100 including a self-tuning computer hardware configuration proposal system according to one example of the present technology. As shown in FIG. 1, a user 102 interacts with a computing device 118 that that runs a client application 120 for communicating with a computing task management interface 130. The client application 120 may be, for example, a web browser accessing a web page and/or web application hosted by the computing task management interface 130 for interacting with the computing task execution system 100.

The computing task management interface 130 provides access to computing resources 140 (e.g., computer servers in a cloud computing environment), which are available in multiple different hardware configurations, identified as first servers in hardware configuration A 142, second servers in hardware configuration B 144, and third servers in hardware configuration C 146. While FIG. 1 merely shows three configurations, in practice, the computing task management interface 130 may provide access to numerous possible computer hardware configurations, such as allowing a user to specify the number of processor cores, amount of memory, attached peripheral devices, storage device configurations, network bandwidth configurations, and the like, such that there may be tens or hundreds of possible configurations, or more possible configurations depending on the granularity provided by the computing task management interface 130.

The client application 120 provides a machine-readable specification of a computing task that is to be executed by the computing task execution system 100. For example, the client application 120 may provide a user interface that allows the user 102 to develop a data pipeline for processing data using a visual drag-and-drop interface, where the user 102 drags different transformations onto a canvas and where the user 102 connects outputs of earlier stages to the inputs of later stages. The machine-readable specification may be a binary or textual representation of a program, such as a data processing pipeline for processing raw input data to be transformed for performing machine learning and/or data analytics. In some examples, the machine-readable specification is specified as a sequence of Apache® Spark™ transformations. This representation may be used to configure a computer system to implement the specified program, such as implementing the specified data processing pipeline (e.g., configuring a computer or a cluster of computers running Apache® Spark™ to perform the specified transformations on some given input data). The machine-readable specification may be, for example, a textual format such as extensible markup language (XML), JavaScript Object Notation (JSON), a script (e.g., written in a scripting language such as Bash or PowerShell), or a proprietary data format, or may be a binary format representing a sequence of transformations to be applied to some input data.

As discussed above, the user 102 will typically be asked to specify the type of computer system that will be provisioned to execute the specified computing task, illustrated in FIG. 1 in the simplified form of selecting one hardware configuration from among hardware configuration A, hardware configuration B, and hardware configuration C. Because it may be difficult for a user to determine which hardware configuration would be best suited to handle the computing task, some examples of the present technology relate to a self-tuning computer hardware configuration proposal engine 115 that is configured to generate a proposed computer hardware configuration to execute the computing task based on features of the computing task extracted from the computing task specification. In some examples, the self-tuning computer hardware proposal engine 115 generates the proposal using a reinforcement learning model 155, where the proposal is made based on the machine-readable computing task specification and based on the size and shape of the input data to be processed (e.g., number of data values, size of each data value, etc.), as discussed in more detail below with respect to FIG. 2A.

Continuing with FIG. 1, the computing task management interface 130 may present the proposed computer hardware configuration to the user 102 via the client application 120, and may configure an instance of a computing resource in accordance with a selection of a computer hardware configuration made by the user 102. In some examples, the user makes a selection that is consistent with the proposed computer hardware configuration, but in other cases the user may make a selection that is different from the proposed computer hardware configuration. In other examples, the computing task management interface 130 automatically selects the proposed computer hardware configuration generated by the self-tuning computer hardware configuration proposal engine 115 without requesting authorization or confirmation from the user 102, in which case the proposed computer hardware configuration may be referred to herein as an updated computer hardware configuration.

The instance of the computing resource configured in accordance with the selected computer hardware configuration executes the computing task on the user data and generates an output (e.g., transformed data) which may be written back to a storage device (e.g., a database, a key-value store, an object store, or a block storage device) and/or provided directly to the client application 120. The features extracted from the machine-readable computing task specification and information about the shape of the input data are stored to a user activity log 160 along with execution performance results from the execution. These execution performance results may include, but are not limited to, total execution runtime for the computing task, processor usage (e.g., CPU usage percentage over the course of execution), memory usage (e.g., peak and average memory usage), storage bandwidth, rows of data processed per second, input/output operations per second (IOPS), power consumption, and the like.

A model training process 170 computes an updated reinforcement learning model based on the user activity data stored in the user activity log 160, where the user activity data includes computing task features and execution performance results from executions of multiple different computing tasks on different data having different shapes. Model training will be described in more detail below with respect to FIG. 4A and FIG. 4B. The updated reinforcement learning model computed by the model training process 170 may replace or update the reinforcement learning model 155 used by the self-tuning computer hardware configuration proposal engine 115 in generating its proposed computer hardware configurations for executing the computing tasks.

Figure 2A:
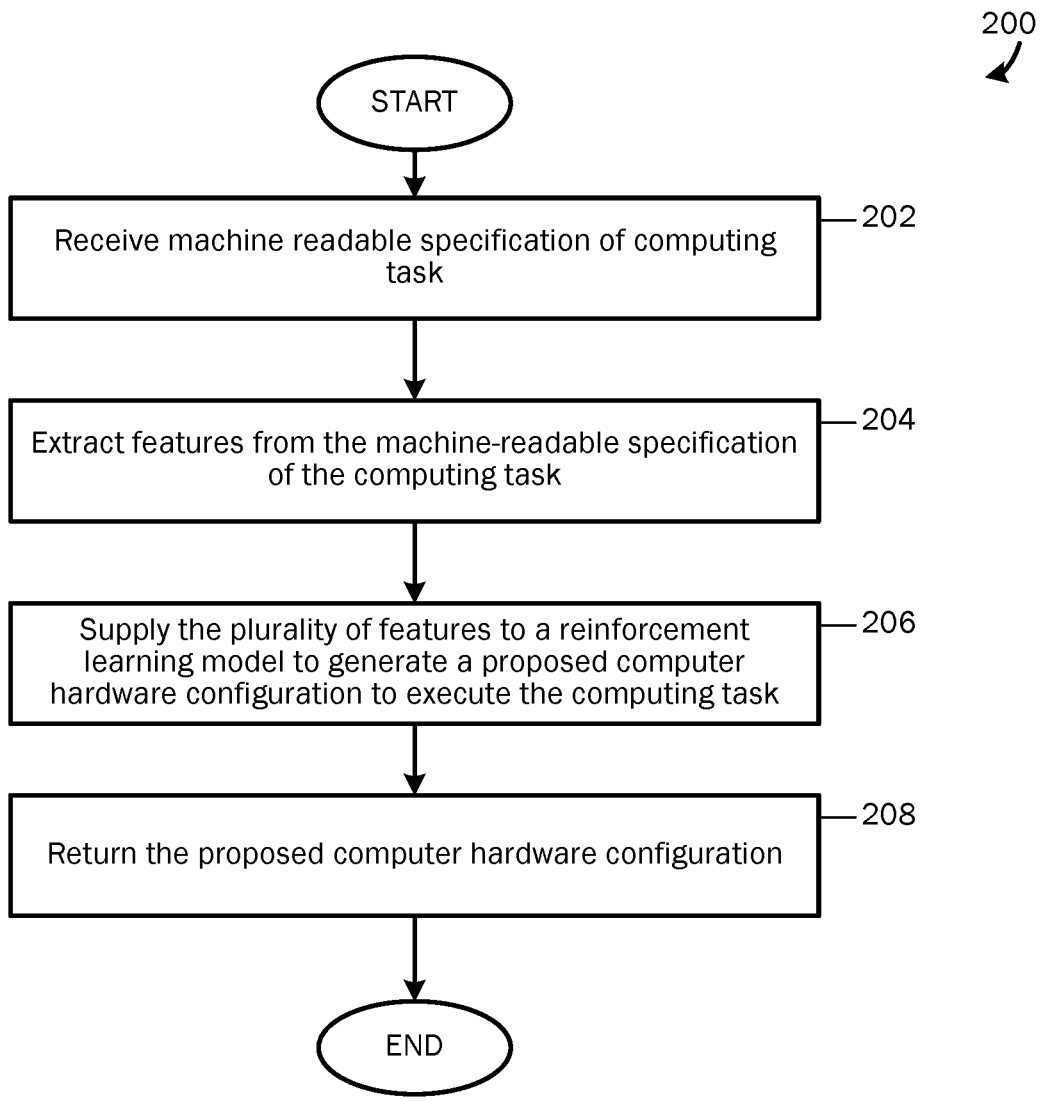
FIG. 2A is a flowchart of a method for generating a proposed computer hardware configuration according to one example of the present technology.

FIG. 2A is a flowchart of a method 200 for generating a proposed computer hardware configuration according to one example of the present technology. As shown in FIG. 2, a computing task management interface 130 receives a computer-readable specification of a computing task (e.g., a data pipeline including a sequence of transformations to be applied to input data) at operation 202. The computer-readable specification of the computing task may also include access to the input data to be processed, a copy thereof, and/or parameters describing a shape of the input data (e.g., total size of the data in bytes, number of data samples or rows of data, structure of each data sample of row, such as the number of fields or columns associated with each data sample, and the data types and sizes of the fields).

At operation 204, features are extracted from the machine-readable specification of the computing task. In some examples, these features are values describing aspects of the data processing pipeline that are relevant to generating the proposed computer hardware configuration. The features may exclude information that is present in the machine-readable specification that is irrelevant to making the recommendation, such as user-specific identifiers (e.g., names of columns of data). The feature extraction may be performed, for example, by the computing task management interface 130 or by the self-tuning computer hardware configuration proposal engine 115 in examples where the self-tuning computer hardware configuration proposal engine 115 receives the underlying machine-readable specification of the computing task. The extracted features capture distinguishing characteristics of the computing task, where the types of features may depend on the particular type or class of computing task.

One example of a class of computing tasks is a data pipeline, as discussed above, for processing and/or transforming raw input data for use in data analytics, data science, machine learning, and the like (e.g., for generating statistical models). Examples of the features that are extracted in the case of a data pipeline are provided below in Table 1. However, the present technology is not limited to use of the features listed in Table 1 and the present technology does not require that all of the features listed in Table 1 be included among the extracted features in systems according to embodiments of the present technology.

TABLE 1

| Feature Extracted from User Input | Description |
|---|---|
| Timestamp | Date and time at which the data pipeline was executed. |
| Transformations | List of transformations that are applied to the data and the number of times each of them is executed. |
| Number of Transformation | Total count of transformations applied to the data. |
| Number of Expensive Transformations | Number of transformations that are applied to the data and are classified as computationally expensive. |
| Rows Read | Number of rows contained in the input data provided by the user. |
| Expected Rows Written | Expected number of rows in the output data resulting after applying the transformations to the input data. |

In addition, as noted above, the features may further include a shape of the input data to be processed by the computing task (e.g., in addition to the number of rows read, shape of the input data may include the number of fields in each row, the size of each row, and/or size of each field).

Figure 2B:
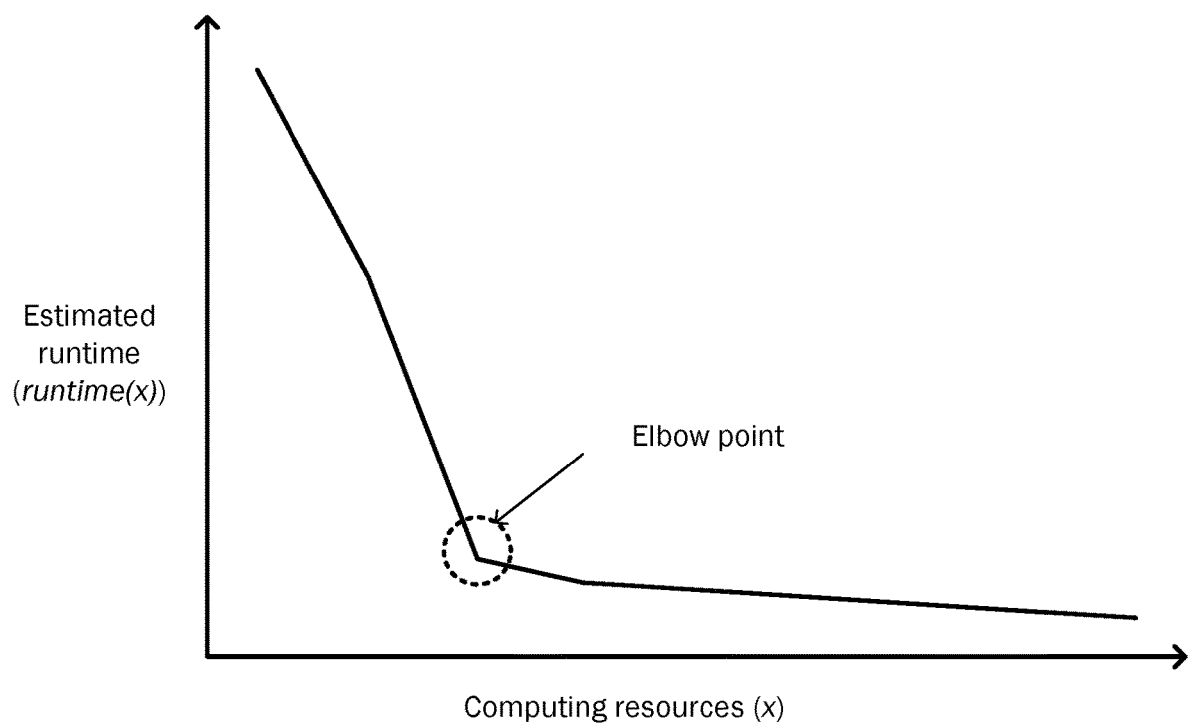
FIG. 2B is a graph depicting an example of a function learned by a reinforcement learning model according to one example of the present technology mapping computing resources to estimated runtime in accordance with features extracted from a computing task.

At operation 206, the self-tuning computer hardware configuration proposal engine 115 supplies these features as input to the reinforcement learning model 155, which is trained to generate a proposed computer hardware configuration based on those features. According to various examples of the present technology, a computer hardware configuration of a computer system, specifies computing hardware that will execute a task, such as a number of CPUs, amount of memory, an amount of storage bandwidth, a number of GPUs, or the like. As one concrete example, the proposed computer hardware configuration may be selection between a "general" compute type and a "memory-optimized" compute type, as well as a number of cores (e.g., selected from a collection of possible numbers of cores, such as: 8 cores, 16 cores, 32 cores, 48 cores, 80 cores, 144 cores, or 272 cores). A reinforcement learning model is a mathematical function that maps from a plurality of features to a recommendation, where the function generates the mapping based on learned parameters through a reinforcement learning process (which is typically contrasted with supervised learning as well as unsupervised learning). In reinforcement learning, an agent takes actions in an environment, where the results are interpreted into a reward that modifies the parameters of the agent in taking future actions. In some examples of the present technology, the actions are the generation of particular computer hardware configurations based on input features describing data processing pipelines. The reward is a score representing the runtime performance of the hardware configuration on the given data pipeline In more detail, in some embodiments of the technology, the reinforcement learning model 155 computes an estimated performance (e.g., runtime) of the given computing task based on the features extracted from the task across a plurality of different possible computer hardware configurations (e.g., runtime(x) where x∈{possible computer hardware configurations}. FIG. 2B is a graph depicting an example of a function learned by a reinforcement learning model according to one example of the present technology mapping computing resources to estimated runtime in accordance with features extracted from a computing task. The horizontal axis of FIG. 2B represents various possible computer hardware configurations x with increasing power (and correspondingly increasing cost) from left to right. The vertical axis of FIG. 2B represents a performance metric or performance score, in this case, runtime, where shorter runtimes indicate better performance. In the example shown in FIG. 2B, initial improvements in runtime are dramatic, e.g., the slope of the graph is large at the lower end, indicating that moving to progressively more powerful computing resources results in large reductions in runtime. However, after reaching an "elbow point," the rate of performance improvement (e.g., decrease in runtime) slows. In other words, the elbow point represents a point of diminishing returns where continued increases in computing resources x result in smaller marginal improvements in performance (e.g., runtime (x)).

Given a pricing model that gives the cost associated with a possible computer hardware configuration cost(x), the self-tuning computer hardware configuration proposal engine 115 finds a value of x that minimizes the cost (cost(x)) that is smaller than the elbow point. More concretely, if the value x at the elbow point is denoted as $x_{elbow}$ and performance (or reward) is expressed as runtime, then:

$$\min_x \mathrm{cost}(x) \text{ such that } \mathrm{runtime}(x) \leq \mathrm{runtime}(x_{elbow}) \leq \mathrm{runtime}(x_{observed})$$

At operation 208, the self-tuning computer hardware configuration proposal engine 115 returns the proposed computer hardware configuration. As noted above, in some examples, the proposed computer hardware configuration may be presented to the user (e.g., in a user interface of the client application 120) for consideration before the user selects a computer hardware configuration to execute the computing task. In some examples, the proposed computer hardware configuration is used by the computing task management interface 130 to automatically allocate an instance of a computing resource (e.g., a virtual machine) that is configured according to the proposed computer hardware configuration.

Figure 3:
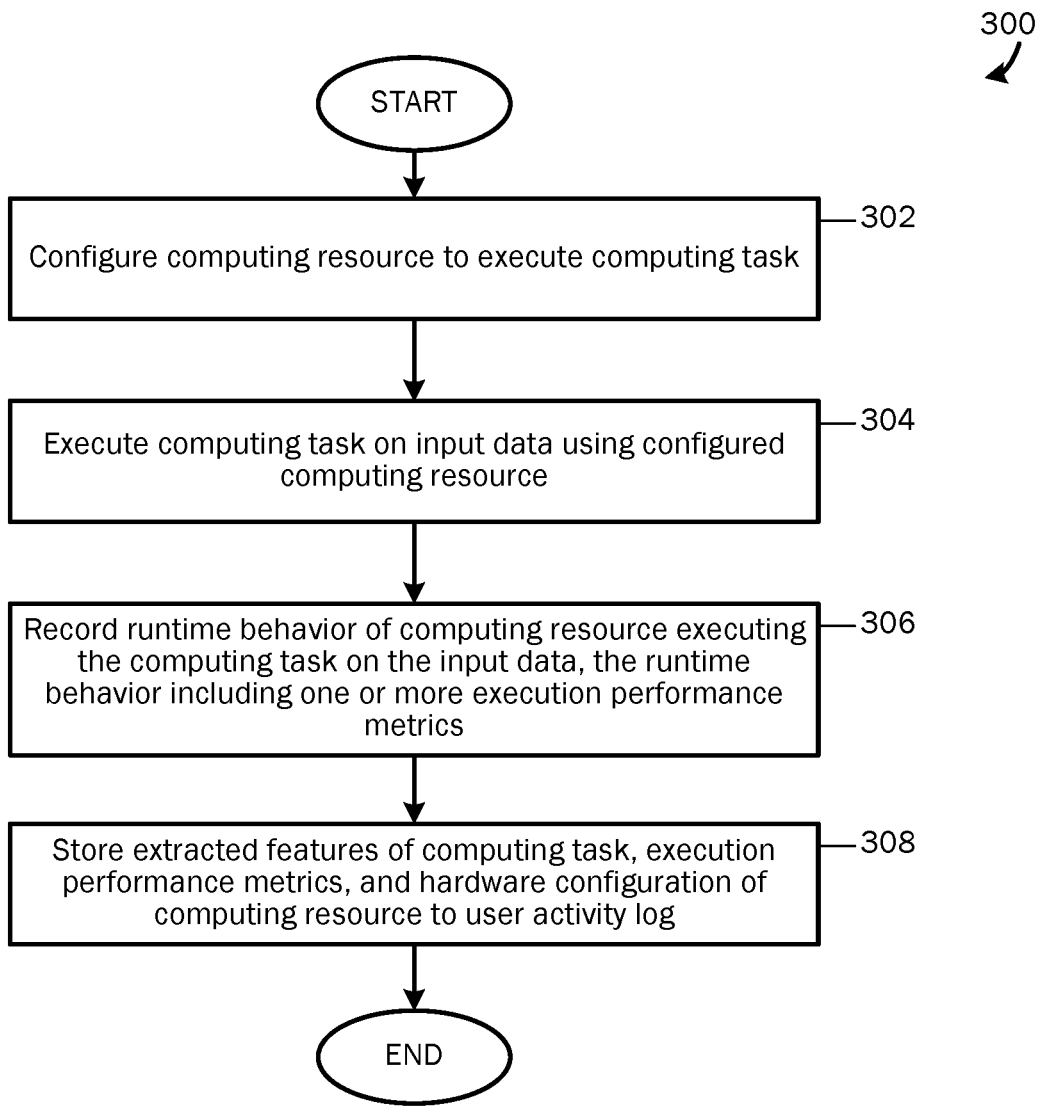
FIG. 3 is a flowchart illustrating a method for executing a computing task and storing execution performance metrics according to one embodiment of the present technology.

FIG. 3 is a flowchart illustrating a method 300 for executing a computing task and storing execution performance metrics or execution performance scores according to one embodiment of the present technology. After a computing resource (e.g., a virtual machine) has been allocated based on a user selection or automatically based on the proposed computer hardware configuration generated by the self-tuning computer hardware configuration proposal engine 115, the computing task management interface 130, at operation 302, configures the computing resource (e.g., a server or virtual machine from a group of virtual machines or servers 144) using the computing task specification and supplies the input data to the configured computing resource to execute the computing task at operation 304. The execution of the computing task generates output data (e.g., in the case of a data pipeline, the result of transforming the input data in accordance with a sequence of transformations specified in the data pipeline). As noted above, the computing resource may write the output data back to a storage device, such a cloud storage database, an object store, or a block storage device, and/or may provide the data directly back to the client application 120.

In the course of executing the computing task, the runtime behavior of the computer system executing the computing task is recorded, where the runtime behavior may be characterized by one or more performance metrics or performance scores are recorded from the computing system at operation 306. For example, one performance metric is total execution runtime (e.g., the difference between the time at which execution of the computing task began processing the input data and the time at which execution of the computing task completed by producing the last output data, which may be extended by set-up operations performed at the beginning of the computing task and tear-down operations performed at the end of the computing task). Other potential performance metrics include, but are not limited to, total execution runtime for the computing task, processor usage (e.g., CPU usage percentage over the course of execution), memory usage (e.g., peak and average memory usage), storage bandwidth, input/output operations per second (IOPS), and the like. In some examples of the present technology, multiple performance metrics associated with an execution of a computing task are combined to generate a single overall performance score.

At operation 308, the features extracted from the machine-readable specification of the computing task, the shape of the input data, the computer hardware configuration, and the execution performance metrics (and/or performance scores) are stored in a user activity log 160. Table 2 is an example of the features, execution performance metrics, and computer hardware configuration parameters that are stored in one example of the present technology where the computing task is a data pipeline. However, embodiments of the present technology are not limited thereto and different features may be stored (e.g., for different types of computing tasks), different performance metrics, and different computer hardware configuration parameters may be stored in other embodiments of the present technology.

TABLE 2

| Features, Execution Performance, and Hardware Configuration | Description |
| --- | --- |
| Timestamp | Date and time at which the data pipeline was executed. |
| Transformations | List of transformations that are applied to the data and the number of times each of them is executed. |
| Number of Transformation | Total count of transformations applied to the data. |
| Number of Expensive Transformations | Number of transformations that are applied to the data and are classified as computationally expensive. |
| Rows Read | Number of rows contained in the input data provided by the user. |
| Rows Written | (Expected) number of rows in the output data resulting after applying the transformations to the input data. |
| Sources | List of types of locations from which the input data is retrieved from and the number of times each type is consumed. |
| Runtime | Time duration of the data pipeline's execution. |
| Compute Type | Type of virtual machine used to execute the data pipeline. E.g.: general versus memory-optimized versus I/O-optimized. |
| Number of cores | Number of CPU cores allocated for the execution of the data pipeline. E.g.: 8 cores, 16 cores, 32 cores, 48 cores, 80 cores, 144 cores, or 272 cores. |

In some examples, the reinforcement model is implemented by a contextual bandit, although embodiments of the present technology are not limited thereto. A reinforcement learning task is typically defined by three components: states, actions, and rewards. A state (S) is a representation of the environment in which an agent takes an action (A), and the reward (R) is a metric or score that signals the outcome of choosing a particular action A in a state S. Therefore, the reinforcement model used by a self-tuning computer hardware configuration proposal engine may treat: the features extracted from the machine-readable computing task specification as the state; the collection of all possible computer hardware configurations as the set of possible actions that the agent can take; and the reward or score can be computed based on the performance metrics (e.g., where a shorter runtime corresponds to a higher reward). Other examples of reinforcement learning models that may be applied in the present technology (besides contextual bandit reinforcement learning models) include, but are not limited to: active learning; full reinforcement learning; multi-armed bandits; imitation learning or behavior cloning; and meta reinforcement learning.

Figure 4A:
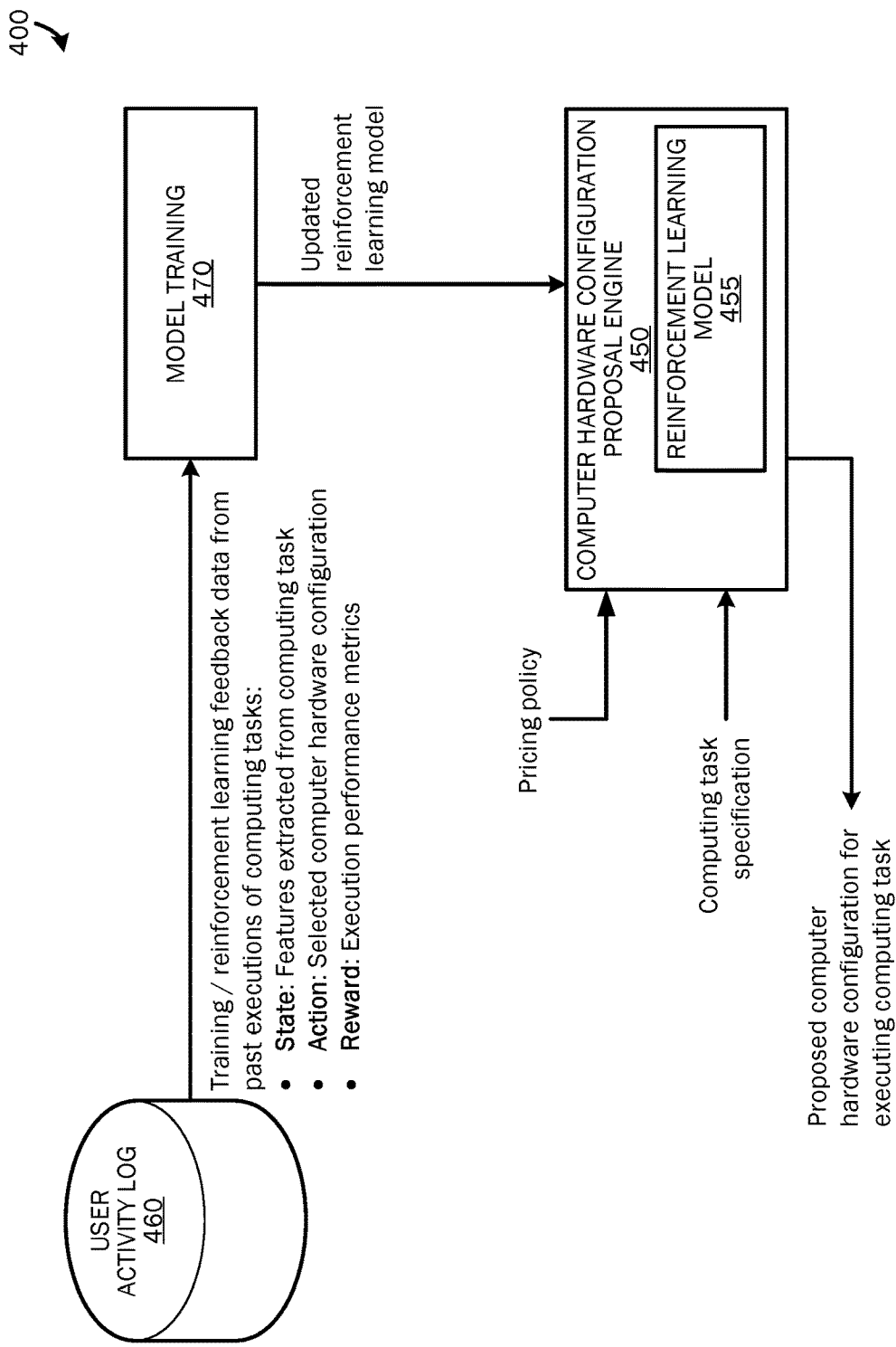
FIG. 4A is a block diagram illustrating a system for training of a reinforcement learning model of a self-tuning computer hardware configuration proposal system according to one embodiment of the present technology.
Figure 4B:
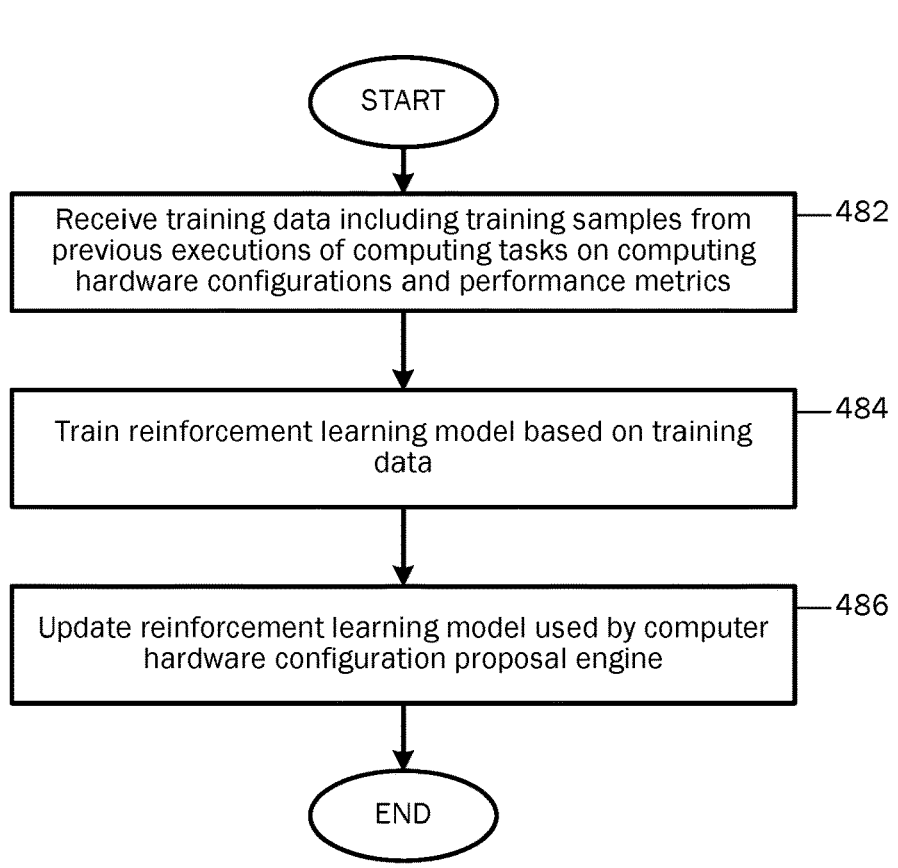
FIG. 4B is a flowchart of a method for training a reinforcement learning model of a self-tuning computer hardware configuration proposal system according to one embodiment of the present technology.

FIG. 4A is a block diagram illustrating a system 400 for training of a reinforcement learning model of a self-tuning computer hardware configuration proposal system according to one embodiment of the present technology, and FIG. 4B is a flowchart of a method 480 for training a reinforcement learning model of a self-tuning computer hardware configuration proposal system according to one embodiment of the present technology.

At operation 482, a model training system 470 receives training data or reinforcement learning feedback data from the user activity log 460, where the user activity log includes training samples from individual executions of various computing tasks (states) on computer hardware configurations (previously chosen actions) and associated performance metrics (rewards or scores) such as execution runtime. Each training sample corresponds to a single execution of a computing task and may include, for example, the machine-readable specification of the computing task (and/or the features extracted therefrom), the computer hardware configuration that executed the computing task, and performance scores from the execution of the computing task.

At operation 484, the model training system 470 uses the training or reinforcement learning feedback data to train or update a policy for selecting an action (e.g., a computer hardware configuration) based on a state (e.g., features extracted from a given input computing task) that maximizes the reward (e.g., performance of performing the computing task).

In some examples of the present technology, as a part of training or updating the policy at operation 484, the model training system 470 learns a cost-reward estimator that estimates the reward for a given cost and based on a given pricing policy. See, e.g., FIG. 2B described above as one example of a cost-reward estimator, where the cost-reward estimator is used to compute or select an action from among the possible actions based on a given context in accordance with a pricing policy.

Various examples of the present technology apply different cost-reward estimators. These cost-reward estimators include, for example, a direct method, an inverse propensity method, and a doubly robust method. The direct method builds a collection of regression functions, one for each action (e.g., compute type) that is optimized for. It specifically maps the set of features to the performance metrics or performance score (e.g., based on runtime incurred) for a given compute resource type. The inverse propensity weighting estimator fits a regression function on the propensity weighted performance metrics (e.g., runtime) to control for the selection bias encountered in the dataset (e.g., 76% generalized compute type with 8 virtual cores). The doubly robust method fits the regression function on the estimate from the direct method plus the propensity weighted residual from the direct method.

Some of the examples presented above relate to a model training system that continually performs offline reinforcement learning or batch learning where the reinforcement learning model is continually and periodically updated based on a batch of additional training data that includes observations from multiple executions of computing tasks (e.g., a plurality of different computing tasks executed on computing systems having different computer hardware configurations and having different execution performance scores), but where the reinforcement learning model remains the same between performing these batch updates. For example, in an offline reinforcement learning or a batch learning approach, observations may be collected over a period of time, such as one week, and the reinforcement learning model is retrained on a weekly basis, in accordance with the batch of data collected over the course of the previous week.

In additional examples of the present technology, the model training system 470 continually performs online reinforcement learning or continuous learning, such as where the reinforcement learning model 455 (e.g., the policy learned and implemented by the reinforcement learning model) is dynamically updated on a per-sample basis as new data samples corresponding to executions of computing tasks are completed and stored in the user activity log 460. In some examples, the self-tuning computer hardware configuration proposal engine 450 according to the present technology interacts with data flows (e.g., incoming computing task specifications) on the fly using the reinforcement learning model 455 by generating an action (e.g., a selection of a particular computer hardware configuration), and then the model training system 470 updates the reinforcement learning model 455 in accordance with the reward (e.g., performance metrics and/or performance scores associated with the execution) obtained from executing the computing task on the particular computer hardware configuration. In other words, the reinforcement learning model 455 may initially start with a random computer hardware configuration selection policy which will likely lead to high runtime in the initial stages of learning, but with observing more performance metrics or performance scores associated with different choices of computer hardware configurations, the reinforcement learning model 455 learns to choose compute types that lead to reduced runtime. Accordingly, in an online reinforcement learning or continuous learning approach, the reinforcement learning model is updated in near-real time in response to each new observation, such that users of the reinforcement learning model can immediately benefit from observations collected from recent executions of computing tasks, without having to wait until the next update of the model (e.g., the following week) in the case of a batch reinforcement learning or offline reinforcement learning process.

Figure 4C:
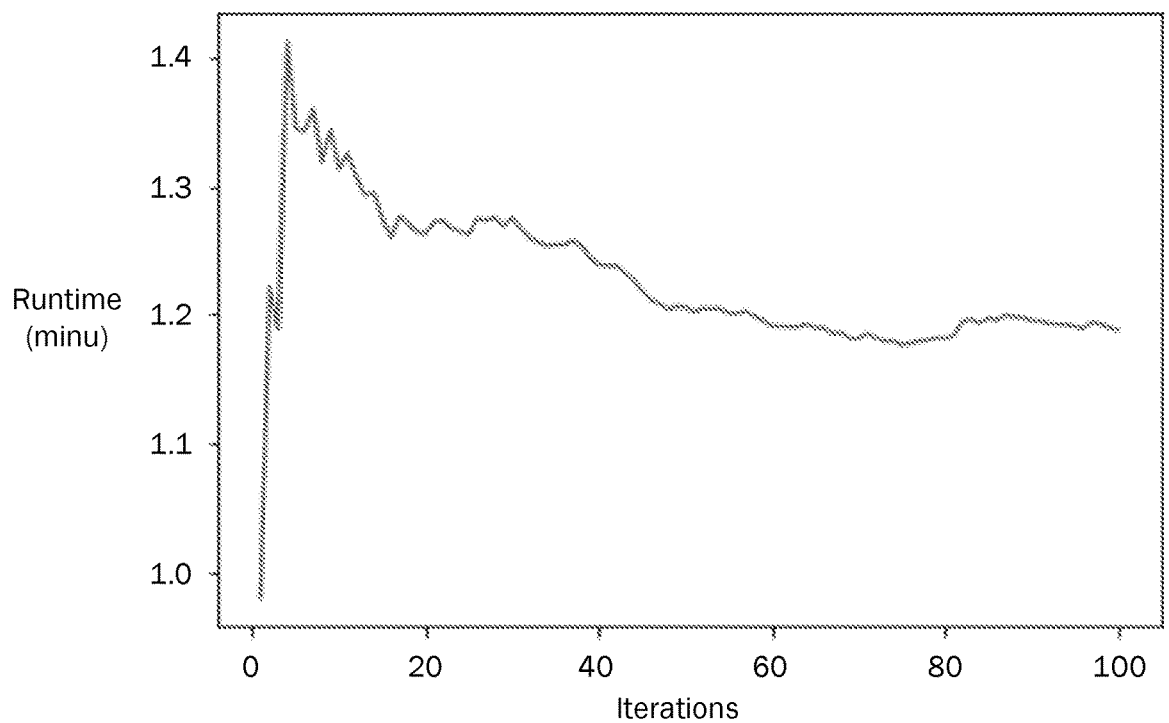
FIG. 4C is a graph depicting runtime performance of executing a computing task using a computer system configured in accordance with a computer hardware configuration selected by a reinforcement learning model.

FIG. 4C is a graph depicting runtime performance of executing a computing task using a computer system configured in accordance with a computer hardware configuration selected by a reinforcement learning model, where the reinforcement learning model is trained using online learning in which the results (runtime performance) of the previous selection of computer hardware configuration is used, in conjunction with the previous features extracted from the computing task to update the model before the model generates another proposal in a next iteration. These were generated based on a fully labelled data set generated from experimental data flows. As seen in FIG. 4C, the curve exhibits a rise in runtime early in the number of iterations, and then the runtime quickly decreases and tapers off with experience (further iterations). In the online learning setting, there is a trade-off between selecting good computer hardware configurations it has seen so far and exploring new computer hardware configurations that might potentially improve performance. This trade-off is sometimes referred to as the explore-exploit dilemma. In the example shown in FIG. 4C, an epsilon greedy algorithm with (epsilon=0.1) was used to select between explore-actions versus exploit-actions.

In addition to improving the selection of a computer hardware configuration from a particular set of possible computer hardware configurations, the same system according to the present technology may also self-tune and automatically learn to generate new proposals based on explorations of new computer hardware configurations as they become available. For example, a cloud computing platform may introduce new computer hardware configurations that were not previously available and therefore not previously among the possible actions (e.g., possible proposed computer hardware configurations) that could be taken the computer hardware configuration proposal engine. These new computer hardware configurations may include, for example, different processor architectures (e.g., x86 versus ARM), different numbers of processors, different memory configurations or types of memory (e.g., high bandwidth memory), different hardware accelerators (e.g., specialized digital signal processors, artificial intelligence/neural network accelerator processors, and field programmable gate arrays configured to accelerate particular computations), and the like. By taking explore actions to propose these new computer hardware configurations on various computing tasks, the model training process automatically learns the performance characteristics of these new computer hardware configurations on different computing tasks and updates the statistical model to automatically propose these new computer hardware configurations based on the features extracted from the computing tasks.

In some examples of the present technology, the performance characteristics of various computing tasks may change over time due to changes in the underlying software environments in which the configuration hardware executes computing tasks. For example, in the case where a computing task is a sequence of Apache® Spark™ transformations, changes to the underlying Apache® Spark™ software platform (e.g., upgrades to new versions) may include optimizations that improve the performance of particular transformations on particular hardware. For example, a software update may cause a transformation that was previously computationally expensive to be much faster to perform on particular hardware, such that a similar runtime can be obtained using less powerful hardware. For example, a transformation that previously only used scalar instructions may be rewritten to use single-instruction-multiple-data or SIMD instructions, or an algorithmic improvement may increase efficiency by reducing the number of clock cycles or the amount of memory consumed by particular transformations while generating the same results. As still another example, an algorithm in the underlying software may be updated to make better use of multiple parallel computing threads, such that there is a greater benefit to access to more CPU cores than in the previous version of the software.

Accordingly, aspects of the present technology provide systems and methods for generating proposed computer hardware configurations for different computing tasks. The system is self-tuning in that it automatically observes the runtime behavior or runtime performance of various computer hardware configurations on various computing tasks, and updates its statistical model to output suitable computer hardware configurations for running these various tasks with good performance (e.g., a good or optimal tradeoff between runtime and cost). The system also automatically adapts to changes in the computing environment, such as changes in the form of the data to be processed by the computing task, changes in the computer hardware configurations that are available in the computing environment, changes in the software environment that executes the computing tasks, and the like.

Figure 5:
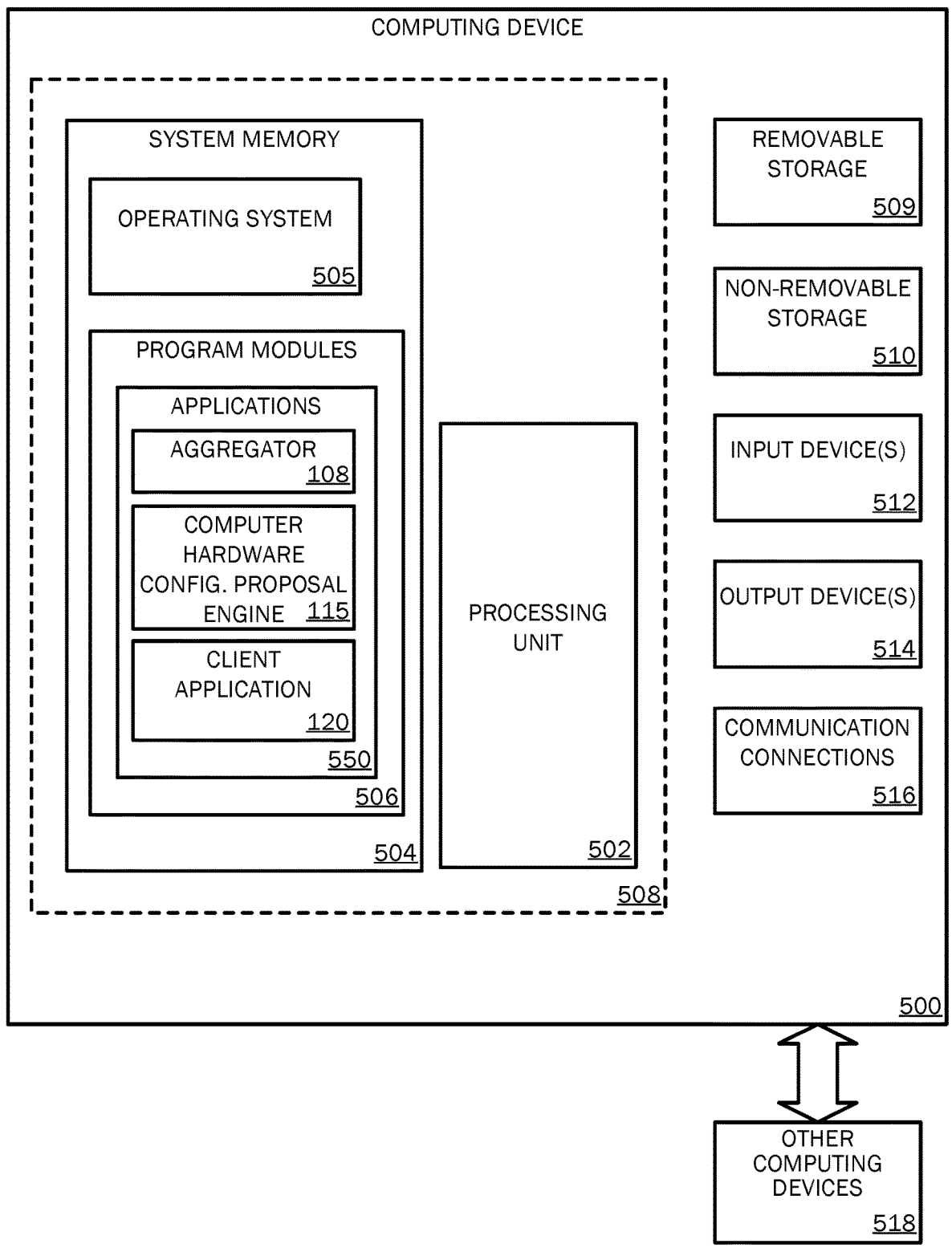
FIG. 5 is a block diagram illustrating example physical components of a computing device with which aspects of the invention may be practiced.
Figure 6A:
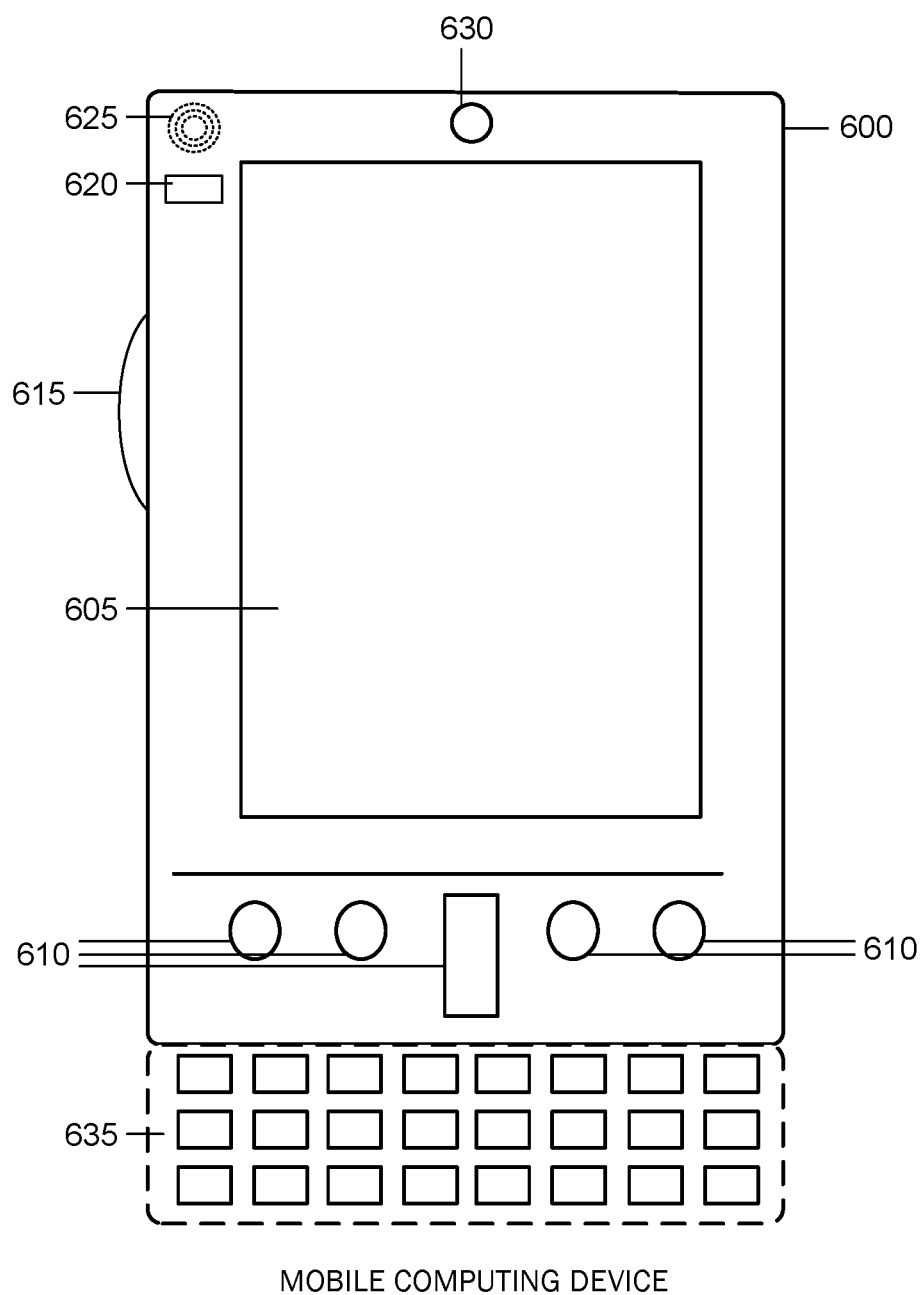
FIGS. 6A and 6B are simplified block diagrams of a mobile computing device with which aspects of the present invention may be practiced.
Figure 6B:
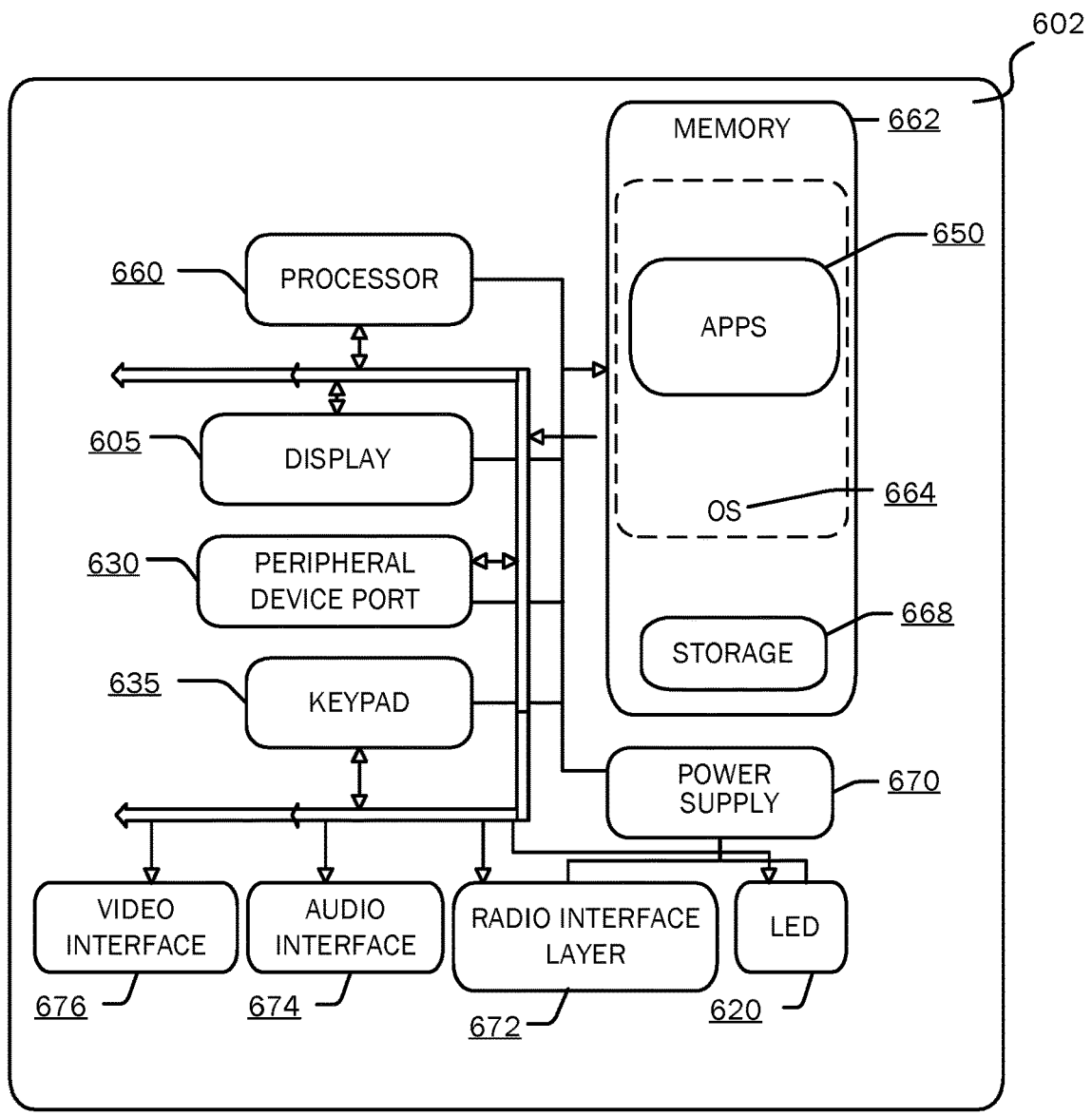
Figure 7:
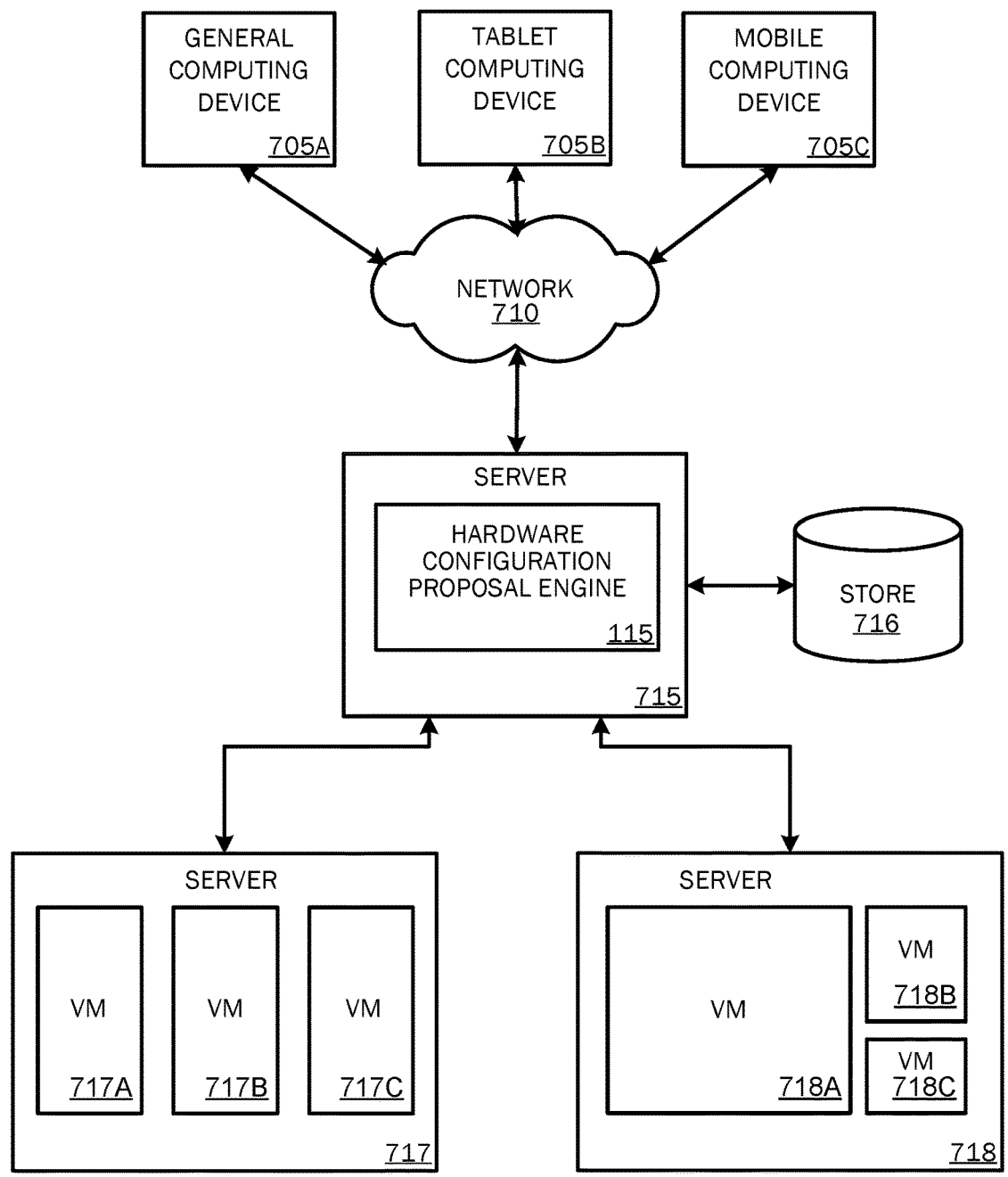
FIG. 7 is a simplified block diagram of a distributed computing system in which aspects of the present invention may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the client device 118 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as the aggregator 108, self-tuning computer hardware configuration proposal engine 115, or client application 120. In some examples, the self-tuning computer hardware configuration proposal engine 115 and client application 120 operate on different computing devices, such as a server computing device and a client computing device, respectively, in communication over a network (e.g., the Internet). The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the method 400 illustrated in FIGS. 4A-4B. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating, using a reinforcement learning model, a proposed computer hardware configuration for executing a computing task and updating the reinforcement learning model based on data from past executions of computing tasks, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing a self-tuning computer hardware configuration proposal engine 115 configured to use a reinforcement learning model to propose computer hardware configurations for executing computing tasks, as described above. A server 715 may provide the self-tuning computer hardware configuration proposal engine 115 to clients 118. As one example, the server 715 may be a web server providing the application 120 over the web. The server 715 may provide the self-tuning computer hardware configuration proposal engine 115 over the web to clients 118 through a network 710. By way of example, the client computing device 118 may be implemented and embodied in a personal computer 705A, a tablet computing device 705B and/or a mobile computing device 705C (e.g., a smart phone), or other computing device. Data associated with the self-tuning computer hardware configuration proposal engine 115, such as the user activity log 160 may be stored in a persistent storage device, represented in FIG. 7 as store 716. As shown in FIG. 7, the server 715 communicates with one or more servers 717 and 718 which may host one or more virtual machines (VM) 717A, 717B, and 717C and 718A, 718B, and 718C, respectively. In some examples of the present technology, computing tasks received from the client computing devices are deployed onto virtual machines in accordance with a computer hardware configuration, where the particular selected computer hardware configuration is proposed by the self-tuning computer hardware configuration proposal engine 115.

As will be understood from the foregoing disclosure, one aspect of the technology relates to a method for recommending a computer hardware configuration, including: receiving, by a processor, a machine-readable specification of a computing task; extracting, by the processor, a plurality of features from the machine-readable specification of the computing task; supplying, by the processor, the plurality of features to a reinforcement learning model to generate a proposed computer hardware configuration to execute the computing task; and providing, by the processor, the proposed computer hardware configuration to a user.

The method may further include updating the reinforcement learning model in accordance with offline learning based on a batch of training data including a plurality of training samples, a training sample of the batch of training data including: a plurality of features of a training sample computing task; a training sample computer hardware configuration; and a performance score of an execution of the training sample computing task on a computer system configured in accordance with the training sample computer hardware configuration. The training sample may be collected by: loading the training sample computing task on the computer system configured in accordance with the training sample computer hardware configuration; recording runtime behavior of the computer system associated with executing the training sample computing task; and generating the performance score of the execution based on the runtime behavior.

The method may further include updating the reinforcement learning model in accordance with online learning based on a single training data sample including: a plurality of features of a training sample computing task; a training sample computer hardware configuration; and a performance score of an execution of the training sample computing task on a computer system configured in accordance with the training sample computer hardware configuration.

The proposed computer hardware configuration may include: a number of processor cores. The proposed computer hardware configuration may include a compute type of a plurality of compute types, the plurality of compute types including: a memory-optimized compute type; and a general compute type. The computing task may include a data processing pipeline. The reinforcement learning model may include a contextual bandit.

One aspect of the present technology relates to a system for recommending a computer hardware configuration, including: a processor; and memory storing instructions that, when executed by the processor, cause the processor to: receive a machine-readable specification of a computing task; extract a plurality of features from the machine-readable specification of the computing task; supply the plurality of features to a reinforcement learning model to generate a proposed computer hardware configuration to execute the computing task; and provide the proposed computer hardware configuration to a user.

The memory may further stores instructions to update the reinforcement learning model in accordance with offline learning based on a batch of training data, a training sample of the batch of training data including: a plurality of features of a training sample computing task; a training sample computer hardware configuration; and a performance score of an execution of the training sample computing task on a computer system configured in accordance with the training sample computer hardware configuration.

The training sample may be collected by: loading the training sample computing task on the computer system configured in accordance with the training sample computer hardware configuration; recording runtime behavior of the computer system associated with executing the training sample computing task; and generating the performance score of the execution based on the runtime behavior.

The memory may further store instructions to update the reinforcement learning model in accordance with online learning based on a single training data sample including: a plurality of features of a training sample computing task; a training sample computer hardware configuration; and a performance score of an execution of the training sample computing task on a computer system configured in accordance with the training sample computer hardware configuration.

The proposed computer hardware configuration may include a number of processor cores. The proposed computer hardware configuration may include a compute type of a plurality of compute types, the plurality of compute types including: a memory-optimized compute type; and a general compute type. The computing task may include a data processing pipeline. The reinforcement learning model may include a contextual bandit.

One aspect of the present technology relates to computer readable media having instructions stored thereon that, when executed by a processor, cause the processor to: receive a machine-readable specification of a computing task; extract a plurality of features from the machine-readable specification of the computing task; supply the plurality of features to a reinforcement learning model including a contextual bandit model to generate a proposed computer hardware configuration to execute the computing task; and provide the proposed computer hardware configuration to a user. The proposed computer hardware configuration may include: a number of processor cores.

The computer readable media may further have instructions stored thereon that, when executed by a processor, cause the processor to update the reinforcement learning model based on a training data sample including: a plurality of features of a training sample computing task; a training sample computer hardware configuration; and a performance score of an execution of the training sample computing task on a computer system configured in accordance with the training sample computer hardware configuration. The computing task may include a data processing pipeline.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way.

The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A method for recommending a computer hardware configuration, comprising:
   receiving, by a processor, a machine-readable specification of a computing task;
   extracting, by the processor, a plurality of features from the machine-readable specification of the computing task;
   supplying, by the processor, the plurality of features to a reinforcement learning model to generate a proposed computer hardware configuration to execute the computing task;
   providing, by the processor, the proposed computer hardware configuration to a user;
   configuring, by the processor, a computing resource in accordance with the proposed computer hardware configuration; and
   updating the reinforcement learning model in accordance with offline learning based on training data comprising a performance score of an execution of a training sample computing task on a computer system configured in accordance with a training sample computer hardware configuration, wherein the training sample is collected by:
     loading the training sample computing task on the computer system;
     recording runtime behavior of the computer system associated with executing the training sample computing task; and
     generating the performance score of the execution based on the runtime behavior.

2. The method of claim 1, wherein the proposed computer hardware configuration comprises: a number of processor cores.

3. The method of claim 1, wherein the proposed computer hardware configuration comprises a compute type of a plurality of compute types, the plurality of compute types comprising:
 a memory-optimized compute type; and
 a general compute type.

4. The method of claim 1, wherein the computing task comprises a data processing pipeline.

5. The method of claim 1, wherein the reinforcement learning model comprises a contextual bandit.

6. A system for recommending a computer hardware configuration, comprising:
 a processor; and
 memory storing instructions that, when executed by the processor, cause the processor to:
  receive a machine-readable specification of a computing task;
  extract a plurality of features from the machine-readable specification of the computing task;
  supply the plurality of features to a reinforcement learning model to generate a proposed computer hardware configuration to execute the computing task;
  provide the proposed computer hardware configuration to a user; and
  configure a computing resource in accordance with the proposed computer hardware configuration; and
  update the reinforcement learning model in accordance with offline learning based on training data comprising a performance score of an execution of a training sample computing task on a computer system configured in accordance with a training sample computer hardware configuration, wherein the training sample is collected by:
   load the training sample computing task on the computer system;
   record runtime behavior of the computer system associated with executing the training sample computing task; and
   generate the performance score of the execution based on the runtime behavior.

7. The system of claim 6, wherein the proposed computer hardware configuration comprises: a number of processor cores.

8. The system of claim 6, wherein the proposed computer hardware configuration comprises a compute type of a plurality of compute types, the plurality of compute types comprising:
 a memory-optimized compute type; and
 a general compute type.

9. The system of claim 6, wherein the computing task comprises a data processing pipeline.

10. The system of claim 6, wherein the reinforcement learning model comprises a contextual bandit.

11. Computer storage media having instructions stored thereon that, when executed by a processor, cause the processor to:
 receive a machine-readable specification of a computing task;
 extract a plurality of features from the machine-readable specification of the computing task;
 supply the plurality of features to a reinforcement learning model comprising a contextual bandit model to generate a proposed computer hardware configuration to execute the computing task;
 provide the proposed computer hardware configuration to a user;
 configure a computing resource in accordance with the proposed computer hardware configuration; and
 update the reinforcement learning model in accordance with offline learning based on training data comprising a performance score of an execution of a training sample computing task on a computer system configured in accordance with a training sample computer hardware configuration, wherein the training sample is collected by:
  load the training sample computing task on the computer system;
  record runtime behavior of the computer system associated with executing the training sample computing task; and
  generate the performance score of the execution based on the runtime behavior.

12. The computer storage media of claim 11, wherein the proposed computer hardware configuration comprises: a number of processor cores.

13. The computer storage media of claim 11, wherein the computing task comprises a data processing pipeline.

14. The system of claim 13, wherein the data processing pipeline includes a sequence of transformations to be applied to input data.

15. The system of claim 14, wherein the machine-readable specification further includes parameters describing an aspect of the input data.

16. The system of claim 15, wherein the aspect of the input data corresponds to:
 a total size of the input data in bytes;
 a number of data samples or rows of the input data; or
 one or more data types of the input data.

17. The system of claim 13, wherein the plurality of features are values describing aspects of the data processing pipeline that are relevant to generating the proposed computer hardware configuration.

18. The system of claim 11, wherein the proposed computer hardware configuration specifies at least one of:
 a number of central processing units (CPUs);
 an amount of memory;
 an amount of storage bandwidth; or
 a number of graphical processing unite (GPUs).

19. The system of claim 11, wherein generating a proposed computer hardware configuration comprises:
 estimating, based on the plurality of features, performance of the computing task across a plurality of different computer hardware configurations; and
 selecting the proposed computer hardware configuration from the plurality of different computer hardware configurations based on an estimated performance of the proposed computer hardware configuration.

20. The system of claim 11, wherein the processor is further caused to:
 in response to providing the proposed computer hardware configuration to the user, receiving a selection of the proposed computer hardware configuration from the user.

* * * * *